(12) United States Patent
Blankenship

(10) Patent No.: US 10,629,084 B2
(45) Date of Patent: Apr. 21, 2020

(54) TACTICAL INJURY SIMULATING TRAINING DEVICE

(71) Applicant: NAR Training, LLC, Greer, SC (US)

(72) Inventor: Stephen Brock Blankenship, Abingdon, VA (US)

(73) Assignee: NAR Training, LLC, Greer, SC (US)

( * ) Notice: Subject to any disclaimer, the term of this patent is extended or adjusted under 35 U.S.C. 154(b) by 0 days.

(21) Appl. No.: 16/033,411

(22) Filed: Jul. 12, 2018

(65) Prior Publication Data

US 2018/0322795 A1   Nov. 8, 2018

Related U.S. Application Data

(63) Continuation of application No. 14/708,657, filed on May 11, 2015, now abandoned.

(60) Provisional application No. 62/013,110, filed on Jun. 17, 2014.

(51) Int. Cl.
*G09B 5/00* (2006.01)
*G09B 23/30* (2006.01)

(52) U.S. Cl.
CPC .............. *G09B 5/00* (2013.01); *G09B 23/30* (2013.01)

(58) Field of Classification Search
CPC .......... F41A 33/00; F41A 33/02; F41A 33/04; F41A 33/06; F41G 3/26; G09B 9/003; G09B 23/30; G09B 5/00
See application file for complete search history.

(56) References Cited

U.S. PATENT DOCUMENTS

| | | |
|---|---|---|
| 6,148,233 A | 11/2000 | Owen et al. |
| 8,267,691 B1 | 9/2012 | Ferris et al. |
| 8,777,226 B1 | 7/2014 | Decker, Jr. |
| 2006/0111754 A1 | 5/2006 | Rezai et al. |
| 2006/0277571 A1 | 12/2006 | Marks et al. |
| 2011/0130643 A1 | 6/2011 | Derchak et al. |
| 2012/0148992 A1 | 6/2012 | Quail |
| 2013/0309633 A1 | 11/2013 | Carriere |

*Primary Examiner* — Timothy A Musselman
(74) *Attorney, Agent, or Firm* — Dority & Manning, P.A.

(57) ABSTRACT

An electrically actuated tactical training device for simulating trauma/injury to a selected region of a tactical operator/trainee's body, such as the torso or an extremity, during a training exercise. The tactical training device delivers a tetany inducing stimulus to a selected muscle group, such as in an extremity or in the torso of a trainee thereby simulating a tactical injury to the stimulated muscle group.

19 Claims, 3 Drawing Sheets

TACTICAL INJURY SIMULATING TRAINING DEVICE

CROSS-REFERENCE TO RELATED APPLICATIONS

This application claims the benefit of U.S. Non-Provisional application Ser. No. 14/708,657, filed May 11, 2015, which claims the benefit of U.S. Provisional Application No. 62/013,110, filed Jun. 17, 2014, each of which is incorporated herein in its entirety by reference.

STATEMENT REGARDING FEDERALLY SPONSORED RESEARCH OR DEVELOPMENT

Not Applicable

BACKGROUND OF THE INVENTION

1. Field of Invention

This invention pertains to a tactical training device. More specifically, the present invention pertains to a tactical injury simulating device for simulating an injury during tactical training exercises.

2. Description of the Related Art

It is well known that approximately 65% of wounds that occur during tactical operations occur to the arm(s) or leg(s), or a combination thereof, of combat personnel. During tactical training, individuals encounter scenarios where they are injured and must self-care or provide care to other combat personnel, variously referred to as "Self Aid" and "Buddy Aid". During training for tactical situations, and especially training in which the trainers implement self-aid scenarios, there is no stimulus to the trainees that simulates an injury to the trainee. While there are known muscle simulating electronic devices in the exercise arts, what is missing from the tactical training art is a system including at least one device for selectively applying an electrical, muscle-contracting, or other noxious, stimuli to one or more individuals during a tactical training operation in order to simulate injury to an extremity, such as an arm or leg, or the torso.

BRIEF SUMMARY OF THE INVENTION

According to one embodiment of the present invention, an injury simulating device for providing noxious and/or muscle contracting stimuli to the torso or to an extremity of a tactical trainee, referred to herein as an injury simulating training device, is provided. In accordance with the present invention, the injury simulating training device is a device that applies an electrical, muscle-contracting, or other noxious, stimuli to an individual during training to best simulate injury incurred during tactical operations. The injury simulating training device is designed specifically to provide a safe yet noxious stimulus to a tactical operator so that they may render aid to themselves or a nearby tactical operator while experiencing a simulated injury and prepare better for the shock of injury produced downrange. It will be understood, that the term "tactical operator" as used herein refers to law enforcement personnel, military personnel, federal agents, private security agents, and similar personnel. The injury simulating training device will allow for more realistic training as individuals will encounter noxious stimuli that renders their affected extremity, or torso muscle group, less effective or ineffective. The injury simulating training device will also allow critical tactical decision making (i.e returning fire, moving to cover) in training until the point where the individual can self-aid. This type of training better prepares the trainee for the shock of injury; and better preparation increases survivability in tactical situations where there is a high probability of injury to the torso or to an extremity.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

According to one embodiment of the present invention, the injury simulating training device 10 is an electronic muscle stimulator device that brings the stimulated muscle into a tetanic contraction, making the limb less useful and rendering the limb ineffective. The tetany forcing muscle contraction is incurred, in one embodiment, by repeat low voltage electrical currents going through the muscle—which prevents relaxation of the affected muscle fibers. This is uncomfortable, as it is with electrical muscle stimulation for exercise or rehabilitation, but not harmful. It will be appreciated that other noxious, muscle contracting stimuli may be utilized. The injury simulating training device 10 is not meant to be utilized as a fitness or muscle training device. Further, in an exemplary embodiment, activation and monitoring of the injury simulating training device 10 is by means of radio frequency transmission and reception. While activation of the device 10 will be necessary, monitoring or feedback from the device are features of one embodiment and are not required to practice the present invention. Further, in an exemplary embodiment, as described in greater detail below, the injury simulating training device 10 is adapted to provide real time monitoring of other physiological parameters, such as heart rate. This allows the injury simulating training device 10 to be worn as part of the standard compliment of gear thereby allowing remote monitoring of a tactical operators heart rate during tactical operations.

Figure 1A:
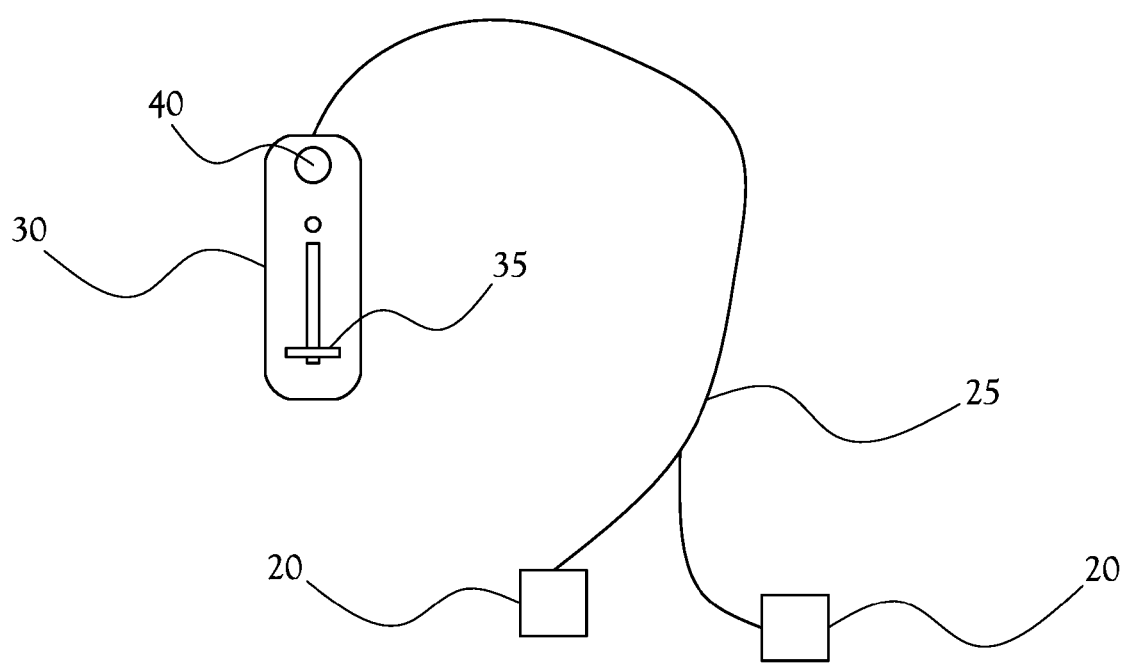
FIGS. 1A and 1B are schematic views of a wired embodiment of an injury simulating component, adapted to be directly attached to a trainee's skin, of the present invention. The various components are represented schematically and are not drawn to scale.
Figure 1B:
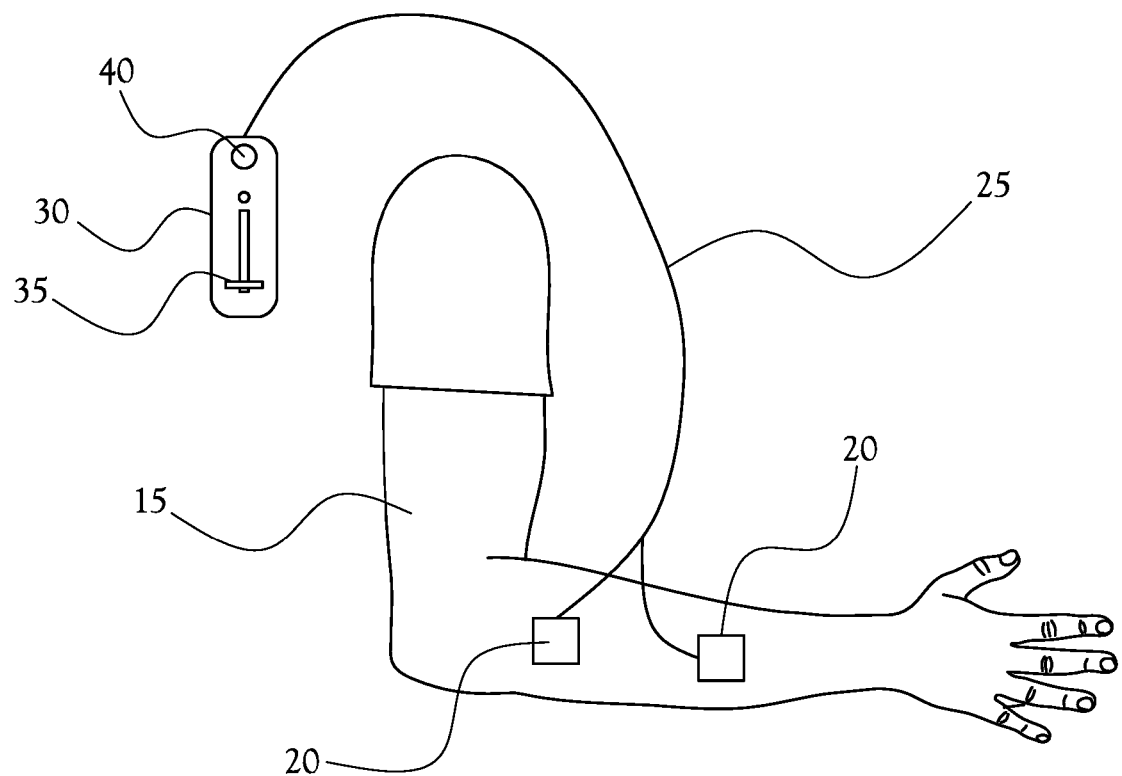

Referring to FIGS. 1A and 1B, the electrical unit 20 of the injury simulating training device 10, in its simplest form, can be adapted to be applied directly to a training operative's skin, such as on the operative's arm 15, leg, or torso, or any part of the body which it is desired to induce muscle contracting tetany. In this regard, it could be externally worn as a patch or sticker or in conjunction with a hydrogel type product, either of which can be activated by contact and is removably secured by an adhesive. Electrical unit 20 is adapted to be in electrical communication, via leads 25, with a control unit 30 which would be, in one embodiment, carried by and operated by training personnel. In an exemplary embodiment, control unit 30 would include a rheostat 35 for adjusting output and a trigger switch 40 for actuating electrical unit 20.

Figure 2:
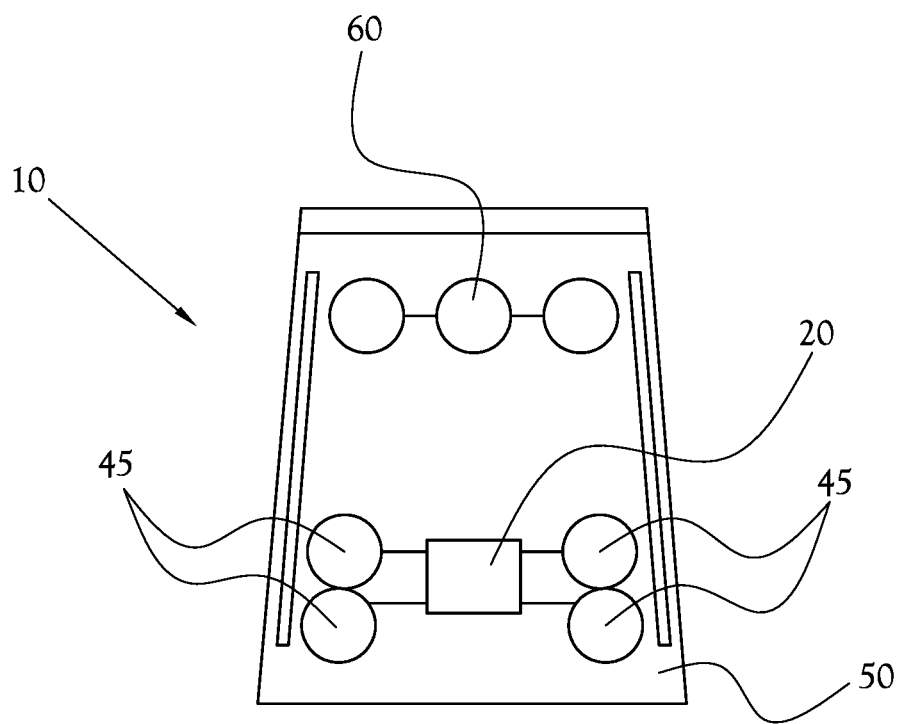
FIG. 2 is a plan view of a further embodiment of an injury simulating component of the tactical training device of the present invention.
Figure 3:
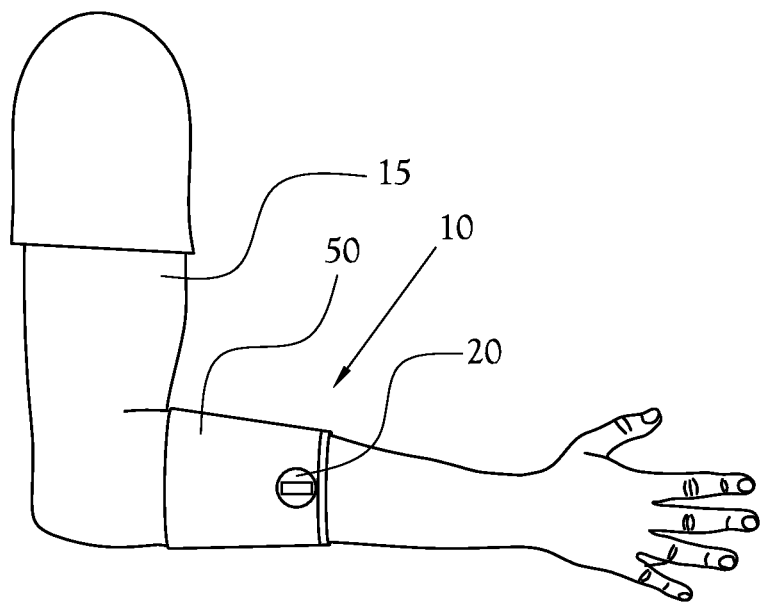
FIG. 3 is a schematic diagram of one embodiment of an injury simulating component of a tactical training device of the present invention as worn on the arm of a trainee.

Referring to FIGS. 2 and 3, electrical unit 20 of the injury simulating training device 10 may be incorporated into a fabric band 50, or otherwise attached to fabric band 50. Other features of the arm band used in conjunction with one embodiment of the injury simulating training device 10 of the present invention facilitate day to day wear in training. While the fabric of the fabric band 50 can be of any material, such as neoprene, elastic, woven, or plastic, it may also incorporate additional functions—including heart rate detection, time keeping through an incorporated watch, compression for athletic performance, which aids in reducing buildup of lactate, or lactic acid, in muscle tissue. This would entice trainees to wear this device daily when training.

Referring to FIG. 2, the injury simulation device 10 can be woven into fabric and worn on the leg, arm, hand, or foot to simulate extremity trauma. Further, while the fabric band 50 is illustrated as being worn on arm 15, it will be appreciated that the fabric band 50 could be adapted to be worn on a portion of the leg, or could be adapted to be worn as a belly band. It will be appreciated that the injury simulating training device 10 may be applied to an upper limb, such as arm 15, including the hand or to a lower limb including the thigh, calf, or foot or any part of the torso. It may be applied by sliding the device 10 on the limb, by use of hook and loop type fasteners, or other types of known fasteners, or as a part of clothing or attached by means of a grommet (not shown).

Fabric band 50 could incorporate gel pads, armor contact points, etc. Additionally, electrical unit 20 could include pads 45 having any highly conductive surface, including a hydrogel type patch. These pads 45 may be independently placed or incorporated into the fabric and are in electrical communication with electrical unit 20. These pads 45 could be defined by carbon or other conductive electrodes which are in electrical communication with electrical unit 20 and which may be utilized to provide the noxious stimulus, and can be woven into the supporting fabric of the injury simulating training device 10. The addition of conduction media, such as conductive gel, is optional. In either arrangement, the power output of the injury simulating training device 10 is approximately 0~90 mA P to P into 500 ohm load, pulse width 200-240 μs pulse rate 120-200 (Hz). It will be appreciated by those skilled in the art that a variety of output currents can be created to produce tetany and/or other noxious stimulus. Further, the output of the electrical unit 20 may be gauged by sending low, medium, high stimulus-based on individual response. The wave form may be monophasic, or asymmetrical bi-phasic square pulse, or other variety of wave form. In an exemplary embodiment, electrical unit 20 that provides a tetany inducing stimulus is approximately, 53 mm×30 mm×10 mm. Of course, it will be appreciated by those skilled in the art, that electrical unit 20 could be of any selected size or shape. Further, in an exemplary embodiment, each of the various components of the injury simulating training device 10 is powered by means of at least one small 3V coin-shaped, watch-type, battery. Of course, it will be understood that any type of power source is acceptable. Thus, acceptable power sources would include, but not be limited to solar cells, silver oxide, alkaline, lithium, zinc, rechargeable, and non-rechargeable batteries. While in an exemplary embodiment, electrical unit 20 is utilized to provide an electrical stimulus to the targeted muscle group, other mechanisms could be utilized to provide a noxious or muscle-contracting stimuli to the various muscle groups.

Figure 4:
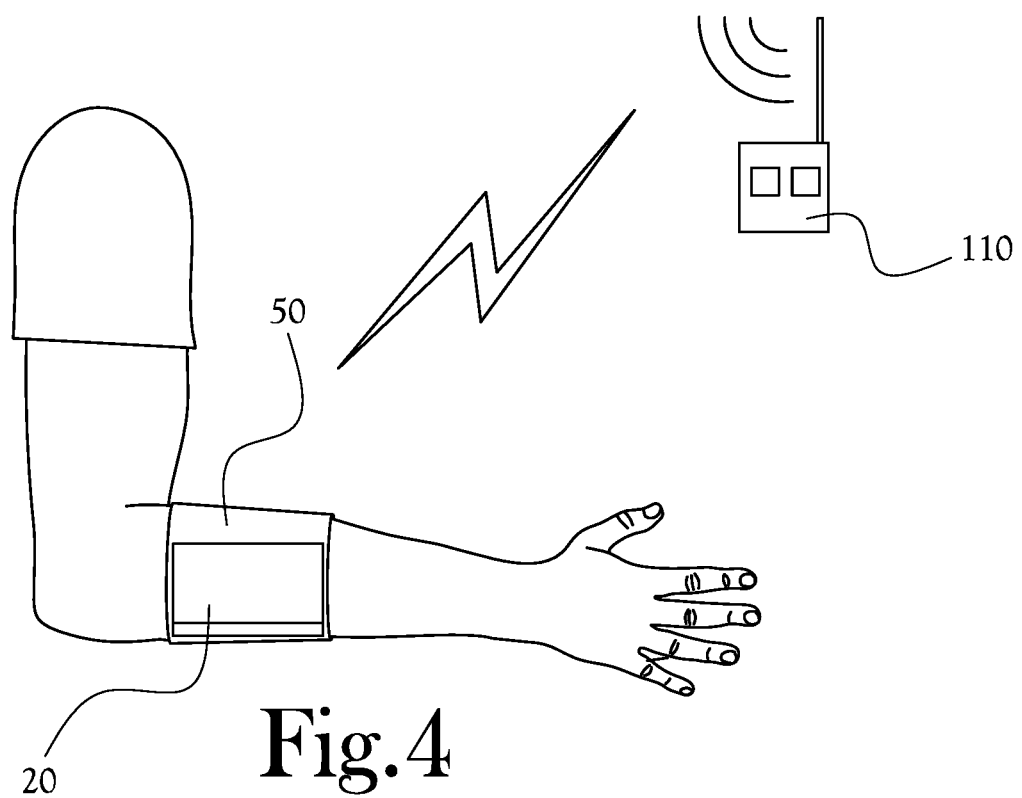
FIG. 4 illustrates a control module in electronic communication with an injury simulating component of the tactical training device of the present invention.
Figure 5:
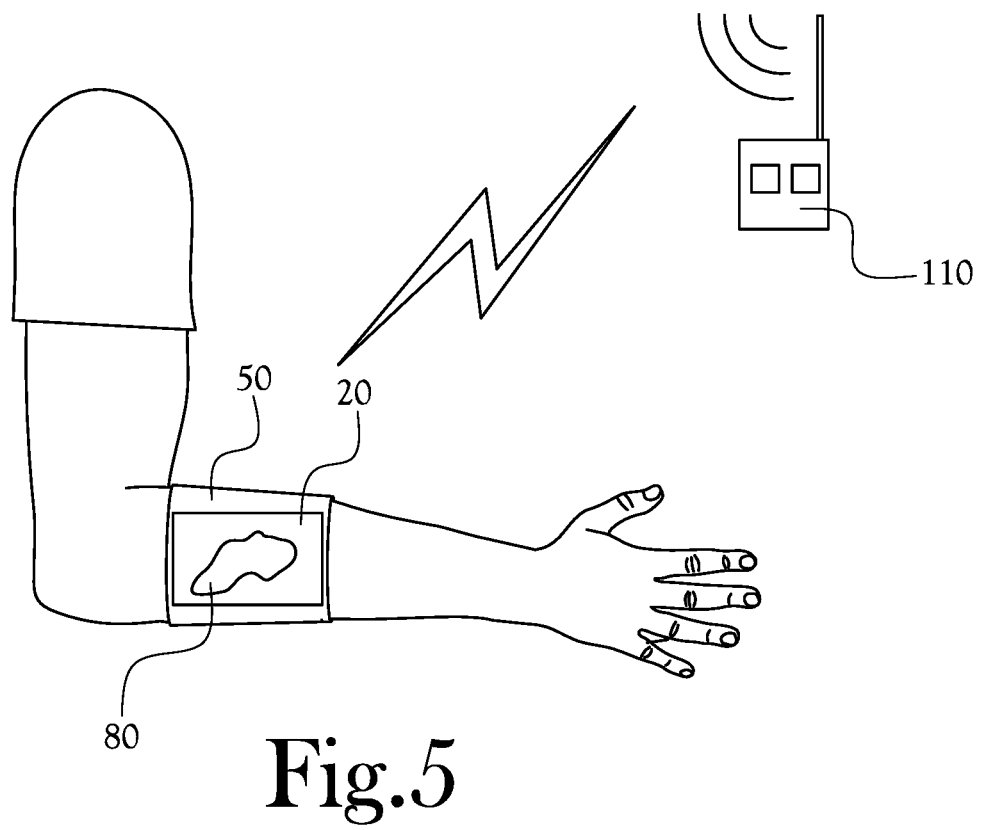
FIG. 5 illustrates a further embodiment of the tactical training device as illustrated in FIG. 4.

While the embodiment described above utilizes an electrical unit 20 that is adapted to be in electrical communication, via leads 25, with a control unit 30, it will be appreciated by those skilled in the art that the electrical unit 20 could be in wireless communication with a radio frequency control unit 110 as illustrated in FIGS. 4 and 5. In this regard, in one embodiment, the radio frequency control unit 110 will have a return signal for indicating that the injury simulating training device 10 is activated; and, in the case of a multi-channel system, i.e. a system controlling multiple injury simulating training devices worn by various team members in a field training exercise as described below, which injury simulating training device 10 is active. Of course, the injury simulating training device 10 could be utilized without performing this function for simplicity of usage. The remote control unit used by the instructor, i.e. radio frequency control unit 110, will be individually charged with a range, in one embodiment, from approximately 25 to approximately 50 meters. Longer ranges or shorter ranges could be sought; however, those skilled in the art will recognize that, for safety purposes, radio frequency control unit 110 should not be used when the designated trainee is beyond, or outside, the visual range of the instructor. As described below, the system is adapted to allow training or supervising personnel to remotely obtain, monitor, and/or record heart rate information on the users/trainees. To incorporate longer range, such as may be found in certain field operations, where, for example, the tactical trainee is being viewed by a camera device prior to activation of the tactical injury simulating device, WiFi or wireless cellular communication, in conjunction with smart phone technology, could be utilized.

Referring to FIG. 2, in one embodiment, the tactical injury simulating device 10 could be adapted to include a heart rate (HR) monitor 60 that will be worn at all times by individuals during all tactical training. The HR monitor 60 allows inner team transmission to a medic or command structure, via Bluetooth® or other wireless communication technology, and allows real time feedback. The same size and weight HR technology and sleeve may be utilized during tactical operations where inner team monitoring of vital signs is felt to be essential.

According to an exemplary embodiment, the injury simulating training device 10 of the present invention can utilize either a single channel or multiple channel output, thereby allowing multiple tactical operators/trainees to wear the injury simulating training devices during training operations or actual tactical operations. In a training exercise involving multiple trainees, a multiple channel output system would allow training personnel to select which trainee would suffer a simulated injury at appropriate times during a training drill. This would be accomplished through activation of a selected tactical operator/trainee's injury simulating training device during the training exercise. Further, it will be appreciated by those skilled in the art that the multi-channel design also allows an instructor to place individual sleeves on multiple limbs of a single operator/trainee, i.e. on the arms, legs, and torso, to provide a wider range of injury simulation. In an exemplary embodiment, the system will include necessary training materials, detailed safety instructions, and instructor certification for usage.

It will be appreciated that the illustrated sleeve, i.e. fabric band 50, is merely one example of how the injury simulating training device may be worn. Affixing the electrical unit 20 to a selected portion of a trainee's body in a different manner would still allow for the provision of a noxious stimulus for simulating a tactical injury to the torso or to an extremity. Thus, it is within the scope of the present invention that the electrical unit 20 of the injury simulating training device 10 could be adapted into the form of a projectile that is "affixed" to the trainee by throwing or shooting the injury simulating training device onto the trainee. Additionally, visual or audible activators could be provided at the time of the output, such as "you've been hit," "you are injured," or "you are bleeding." Still further, it is known that the sight of blood flow produces psychological as well as physiological effects. Accordingly, for training purposes, the injury simulating training device 10 could be adapted with what is commonly referred to in the film industry as a "blood squib" to simulate blood flow by allowing fake blood to leak or flow from the device sleeve thereby further simulating the effect of a tactical injury. Similarly, as depicted in FIG. 5, the training device could include a prosthetic wound pattern 80 that is covered at the beginning of a training exercise. At an appropriate time, such as coinciding with application of the noxious stimuli, the prosthetic wound pattern 80 could be uncovered. In one embodiment, the prosthetic wound pattern could cover the electrode patch(es) of the noxious stimulator.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A tactical training system for providing a noxious stimulus simulating a tactical injury to a selected portion of a trainee's body, said tactical training system comprising:
   a selectively actuated electronic device adapted to be worn by a tactical operator, wherein said selectively actuated electronic device is adapted for delivering a power output for delivering a tetany-inducing noxious stimulus to a selected portion of the tactical operator's body, said tetany-inducing noxious stimulus being adapted to render the stimulated extremity ineffective thereby simulating a tactical injury;
   a heart rate monitor carried by said selectively actuated electronic device for monitoring a heart rate of the tactical operator, said heart rate monitor being adapted to provide real time feedback;
   a verbal activator to be actuated upon delivery of said power output for providing verbal confirmation of the simulated tactical injury to the tactical operator and a selectively actuated visual confirmation of said simulated tactical injury adapted to be actuated upon delivery of said power output, whereby said verbal and visual confirmation of said simulated tactical injury create physiological and psychological effects upon the tactical operator; and
   an operator control unit in communication with said selectively actuated device for actuating said selectively actuated electronic device and said heart rate monitor carried by said selectively actuated electronic device thereby allowing transmission of the tactical operator's heart rate to a command structure.

2. The tactical training system of claim 1 wherein said operator control unit is in wireless communication with said selectively actuated electronic device.

3. The tactical training system of claim 1 wherein said tetany-inducing stimuli is electrical, and further wherein said power output of said selectively actuated electronic device is in a range of 0-90 mA P to P into a 500 ohm load and has a pulse width of 200-240 µs and a pulse rate of 120-200 Hz.

4. The tactical training system of claim 1 wherein said operator control unit is in wired electrical communication with said device for delivering a noxious stimulus to the tactical operator.

5. The tactical training system of claim 1 wherein said operator control unit is a multi-channel radio frequency device adapted to selectively and independently communicate with a plurality of said selectively actuated devices.

6. The tactical training system of claim 1 wherein the selectively actuated electronic device is attached to an extremity of the tactical operator's body.

7. The tactical training system of claim 1 wherein the selectively actuated electronic device is carried by a fabric band adapted to be worn by the tactical operator.

8. The tactical training system of claim 1 wherein said verbal confirmation of the simulated tactical injury is a verbal phrase selected from a group consisting of the phrases "you've been hit," "you are injured," and "you are bleeding".

9. A tactical training system for providing a noxious stimulus adapted for simulating a tactical injury to a selected portion of a trainee's body, said tactical training system comprising:
   a selectively actuated electronic device adapted to be affixed to a tactical operator, wherein said selectively actuated electronic device is adapted for delivering a power output for delivering a tetany-inducing stimulus to a selected portion of the tactical operator's body, said tetany-inducing stimulus being adapted to render the stimulated extremity ineffective, wherein said power output of said selectively actuated electronic device is in a range of 0-90 mA P to P into a 500 ohm load and has a pulse width of 200-240 µs and a pulse rate of 120-200 Hz;
   a verbal activator to be actuated upon delivery of said power output for providing verbal confirmation of the simulated tactical injury to the tactical operator and a selectively actuated visual confirmation of said simulated tactical injury adapted to be actuated upon delivery of said power output, whereby said verbal and visual confirmation of said simulated tactical injury create physiological and psychological effects upon the tactical operator; and
   an operator control unit in communication with said selectively actuated device for actuating said selectively actuated electronic device.

10. The tactical training system of claim 9 wherein said operator control unit is in wired electrical communication with said device for delivering a noxious stimulus to the tactical operator.

11. The tactical training system of claim 9 wherein said operator control unit is in wireless radio frequency communication with said device for delivering a noxious stimulus to the tactical operator.

12. The tactical training system of claim 9 wherein said tactical training system further comprises a heart rate monitor carried by said selectively actuated electronic device for monitoring a heart rate of the tactical operator, said heart rate monitor being adapted to provide real time feedback, said heart rate monitor carried by said selectively actuated electronic device thereby allowing transmission of the tactical operator's heart rate to a command structure.

13. The tactical training system of claim 12 wherein said operator control unit is a multi-channel radio frequency device adapted to selectively and independently communicate with a plurality of said selectively actuated electronic devices.

14. The tactical training system of claim 12 wherein the selectively actuated electronic device is attached to an extremity of the tactical operator's body.

15. A tactical training system for providing a noxious stimulus adapted for simulating a tactical injury to a selected portion of a trainee's body, said tactical training system comprising:
- a selectively actuated electronic device adapted to be affixed to a tactical operator for delivering a tetany-inducing stimulus to a selected portion of the tactical operator's body, said tetany-inducing noxious stimulus being adapted to render the stimulated extremity ineffective thereby simulating a tactical injury;
- a means for attaching said selectively actuated device to a selected portion of the tactical operator's body;
- a heart rate monitor carried by said selectively actuated electronic device for monitoring a heart rate of the tactical operator, said heart rate monitor being adapted to provide real time feedback;
- a verbal activator to be actuated upon delivery of said power output for providing verbal confirmation of the simulated tactical injury to the tactical operator and a selectively actuated visual confirmation of said simulated tactical injury adapted to be actuated upon delivery of said power output, whereby said verbal and visual confirmation of said simulated tactical injury create physiological and psychological effects upon the tactical operator; and
- an operator control unit in communication with said selectively actuated device for actuating said selectively actuated electronic device and said heart rate monitor carried by said selectively actuated electronic device thereby allowing transmission of the tactical operator's heart rate to a command structure, and further wherein said operator control unit is a multi-channel radio frequency device adapted to selectively and independently communicate with a plurality of said selectively actuated devices.

16. The tactical training system of claim 15 wherein said means for attaching said selectively actuated device to a selected portion of the tactical operator's body is defined by a fabric compression band adapted to be worn about a selected extremity.

17. The tactical training system of claim 15 wherein said visual confirmation of said simulated tactical injury includes a selectively revealable prosthetic wound pattern.

18. The tactical training system of claim 15 wherein the selectively actuated device is adapted to be attached to an extremity of the tactical operator's body.

19. The tactical training system of claim 15 wherein said tetany-inducing stimuli is electrical, and further wherein said power output of said selectively actuated electronic device is in a range of 0-90 mA P to P into a 500 ohm load and has a pulse width of 200-240 μs and a pulse rate of 120-200 Hz.

\* \* \* \* \*